(12) United States Patent
Gross (10) Patent No.: US 10,800,290 B2
(45) Date of Patent: Oct. 13, 2020

(54) PASSENGER SEAT SYSTEM FOR A MEANS OF TRANSPORT

(71) Applicant: Airbus Operations GmbH, Hamburg (DE)

(72) Inventor: Claus-Peter Gross, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 16/127,802

(22) Filed: Sep. 11, 2018

(65) Prior Publication Data
US 2019/0092190 A1 Mar. 28, 2019

(30) Foreign Application Priority Data
Sep. 27, 2017 (DE) .................. 10 2017 122 401

(51) Int. Cl.
*B60N 2/00* (2006.01)
*B60N 2/015* (2006.01)
*B64D 11/06* (2006.01)

(52) U.S. Cl.
CPC ........ *B60N 2/01583* (2013.01); *B64D 11/064* (2014.12); *B64D 11/0696* (2013.01)

(58) Field of Classification Search
CPC .............. B64D 11/064; B64D 11/0696; B64D 11/0601; B64D 11/0643
USPC ............ 248/421, 429, 500, 503; 297/463.1; 244/118.6
See application file for complete search history.

(56) References Cited

U.S. PATENT DOCUMENTS

| 8,360,386 B2* | 1/2013 | Marechal ........... B64D 11/0696 244/118.5 |
| 9,533,604 B2 | 1/2017 | Nakashima et al. |
| 2009/0134681 A1* | 5/2009 | Quast .................. B60N 2/0806 297/341 |
| 2009/0302665 A1* | 12/2009 | Dowty ............... B61D 33/0057 297/463.1 |
| 2010/0096502 A1* | 4/2010 | VanderWolk ...... B64D 11/0696 244/122 R |

(Continued)

FOREIGN PATENT DOCUMENTS

| DE | 10 2006 022 032 A1 | 12/2006 |
| DE | 10 2009 028 533 A1 | 2/2011 |
| DE | 10 2009 028 903 A1 | 3/2011 |

(Continued)

*Primary Examiner* — Steven M Marsh
(74) *Attorney, Agent, or Firm* — Lerner, David, Littenberg, Krumholz & Mentlik, LLP (57) ABSTRACT

A passenger seat system for a transport means has an elongate carrier structure to be attached, fixedly with respect to a structure, and having a main extent axis and mutually spaced-apart raster openings on the carrier structure top side, raster openings projecting into at least one lateral delimitation of the carrier structure, and a seat having a seat frame, displaceable and arrestable on the carrier structure, a bottom side lying on the carrier structure, and a top side holding a seat surface. The seat frame has an arresting device on the bottom side and has an operating unit coupled to the arresting device. The operating unit is movable into an arresting position and an unlocking position. The arresting device has an arresting lever movable into an engagement position, for lateral engagement into a raster opening, and a release position, in which the arresting lever is released from the carrier structure.

14 Claims, 7 Drawing Sheets

(56) References Cited

U.S. PATENT DOCUMENTS

2014/0077577 A1\* 3/2014 Gensch .............. B64D 11/0696
297/463.1
2019/0308736 A1\* 10/2019 Gross ................. B64D 11/0639

FOREIGN PATENT DOCUMENTS

DE     10 2015 116 414 A1     3/2017
EP     2 679 497 A1     1/2014
JP     2013 189 184 A     9/2013

\* cited by examiner

PASSENGER SEAT SYSTEM FOR A MEANS OF TRANSPORT

FIELD OF THE INVENTION

The invention relates to a passenger seat system for a means of transport, and to a means of transport, in particular an aircraft, having a passenger cabin and having a passenger seat system installed therein.

BACKGROUND OF THE INVENTION

The passenger cabin of a means of transport, for example of a passenger aircraft, commonly has a construction determined by the operator of the means of transport. The construction may relate in particular to a class division, which is associated with individual seat spacings and a particular number and arrangement of other devices. To realize individual seat spacings, a carrier structure is common on a cabin floor, which carrier structure permits a rastered fastening of passenger seats and other fixtures. A carrier structure of said type may for example comprise a seat rail arranged on a floor of the cabin, which seat rail is equipped with openings through which a longitudinal slot extends. Fastening means may be arranged at these openings, which fastening means are connected to the passenger seats or other devices.

It is moreover known for fastening means for passenger seats and other fixtures to be provided which permit quick actuation without the use of tools. An operator of the means of transport is thus provided with the facility to quickly change the construction of the cabin in accordance with demand, and adapt seat spacings or class divisions for example in accordance with the mission.

Concepts for realizing a quickly releasable fastening of said type exist. For example, DE 10 2015 116 414 A1 presents a passenger seat system having an arresting device which is arranged on a seat frame and which has a resiliently mounted arresting body which is movable from an arresting position into a release position by means of a Bowden cable. In the arresting position, the arresting body snaps into a corresponding opening, whereas, in the release position, the arresting device is released from the carrier structure.

BRIEF SUMMARY OF THE INVENTION

The use of a resiliently mounted arresting body, and the introduction or snapping thereof into an opening of a carrier structure by means of spring force, is mechanically very simple. However, the service life of a spring suitable for this purpose, which holds the arresting body securely in the opening, may sometimes be too short for an intended service life of the means of transport. If a spring were to exhibit a mechanical defect, this can have the effect that the respective seat, or the respective seat row, is temporarily rendered unusable.

An aspect of the invention relates to a passenger seat system which permits a quick reconfiguration of a cabin and, at the same time, furthermore exhibits a longer service life.

A passenger seat system for a means of transport is proposed, having at least one elongate carrier structure which can be attached, fixedly with respect to a structure, in the interior of the means of transport and which has a main extent axis and a multiplicity of mutually spaced-apart raster openings on a top side of the carrier structure, which raster openings project into at least one lateral delimitation of the carrier structure, and at least one seat which has a seat frame, which seat frame is displaceable and arrestable on the carrier structure and has a bottom side, which lies on the carrier structure, and a top side, which holds a seat surface. The seat frame has an arresting device on the bottom side and has an operating unit, which is coupled to the arresting device, at a position averted from the bottom side, wherein the operating unit is movable at least into an arresting position and an unlocking position. The arresting device has an arresting lever which is mounted so as to be pivotable about a pivot axis running parallel to the main extent direction and which is movable into an engagement position, for at least lateral engagement into one of the raster openings of the carrier structure, and a release position, in which the arresting lever is released from the carrier structure.

The carrier structure is to be understood as a base for the fastening of passenger seats and other devices in the cabin of the means of transport. Said carrier structure is a component or an arrangement of components which, by means of the fastening thereof, is fixed with respect to a structure in the interior of the means of transport. The carrier structure may for example have two floor rails arranged parallel to one another, which are also known as seat rails, and which have a fastening raster. On said floor rails there may be arranged a rail attachment which provides the stated raster openings. The rail attachment may basically be constructed in the manner of a slide rail which permits the sliding movement of passenger seats and other devices.

The raster openings are situated on the top side of the carrier structure and extend at least to a first lateral delimitation. The raster openings may consequently extend over a side edge of the carrier structure, such that they allow the arresting lever to be received. The arresting lever may consequently extend laterally into a corresponding raster opening.

The raster opening preferably extends only to the first lateral delimitation of the carrier structure. There is then no opening at an opposite lateral delimitation of the carrier structure, such that the arresting lever that moves laterally into a raster opening arrives at a stop or a delimiting edge of the respective raster opening. However, the opening may also be continuous, and consequently extends in or through two mutually oppositely situated lateral delimitations.

The carrier structure, the raster openings and the arresting bodies must, in particular in an aircraft, be designed to pass approval-relevant 16 G load tests. The carrier structure is therefore normally connected fixedly to the structure of the means of transport, and thus permits the adequate introduction of load into the structure.

As mentioned above, the attachment of the carrier structure may be suitably equipped with guide devices in order to permit easier displacement of a passenger seat or of another device. The attachment could be installed on existing floor rails in order for the carrier structure with the features presented above to be realized even in existing passenger cabins. Such floor rails are known for example as Douglas rails. The attachment of the carrier structure may have a particular profile cross section, which may correspond to a profile cross section of a slide body.

The seat frame of the at least one seat may correspond to a conventional seat frame for the respective means of transport. In particular, the seat frame may have multiple mutually spaced-apart frame legs, which stand on the carrier structure and which hold bearing elements for bearing seat cushions. In passenger aircraft, for example, a type of construction of a seat frame which has four legs composed of a metallic material, the profile cross section of which has projections for stiffening purposes, has become established.

The frame legs may, in cross-sectional regions subjected to relatively low load, be equipped with openings or recesses for the purposes of reducing weight. The bearing elements held by the frame legs could for example comprise one or two horizontally arranged tubes. In the configuration of the seat frame, provision could also be made for multiple seats to be arranged on one single seat frame. It would consequently be possible for the bearing elements to also extend in a lateral direction considerably beyond the seat frame.

In the consideration below, an upper side, which holds a seat surface, of the seat frame is referred to as "top side", whereas a lower side, which is connected to the carrier structure, is referred to as "bottom side". The height of the seat frame and thus the approximate vertical position of the top side of the seat frame are determined by a corresponding seat height for a passenger seat.

The arresting device is to be understood as an apparatus which permits selective arresting of the seat frame on the carrier structure, which apparatus should be releasable as quickly as possible and as far as possible without great expenditure of force, but should be very reliably capable of being arrested again and subjected to the full load on which the design of the seat frame is based.

The operating unit is a device averted from the carrier structure. Said operating unit is preferably arranged on a top side of the seat frame, and therefore so as to face towards a user. It should be possible for the arresting device to be reliably activated or released by means of the operating unit, wherein this should be performed without the use of tools. The operating unit may have in particular a handle, a lever, a button or some other actuating element that can be moved between predefined positions by a user. The coupling with the aid of the arresting mechanism transmits the movement from the operating unit to the arresting device in order to move the arresting body situated thereon.

The arresting lever is pivotable about a pivot axis running parallel to the main extent direction. Here, the pivot axis may be positioned at a location which permits the insertion and release of the arresting lever into and out of one of the raster openings when the seat frame is situated on the carrier structure. Here, the location is dependent on a preferred pivot angle range of the arresting lever and the size thereof, that is to say the extent from the pivot axis to an engagement end, averted from the pivot axis, of the arresting lever, which engagement end is inserted into the respective raster opening.

In the engagement position, by means of the lateral insertion of the arresting lever, any dirt that is present can be expelled from the raster opening by the arresting lever itself. Furthermore, when the arresting lever is situated within the raster opening, a displacement of the seat frame along the main extent direction is prevented by means of areal contact of the arresting lever with an edge of the respective raster opening along the main extent direction.

Altogether, by means of the passenger seat system according to an embodiment of the invention, a reliable and quick arresting action without the use of tools, and a quick release, of a passenger seat in a means of transport is made possible. The above-stated features make it possible to realize a longer service life, and the successful arresting of an arresting body is not dependent on the force action of a spring.

In a preferred embodiment, an arresting mechanism mechanically directly couples the arresting device to the operating unit such that the position of the arresting lever is determined exclusively by the position of the operating unit. By contrast to the situation in the above-cited prior art, the arresting mechanism realizes a rigid coupling of the operating unit and the arresting device. Here, the rigid coupling is to be understood to mean that a movement of the arresting lever is caused exclusively by the movement of the operating unit. In other words, the position of the arresting lever has no degree of freedom if the position of the operating unit is predefined. This has the particular advantage that a bidirectional transmission of force from the operating unit to the arresting lever is realized. The position of the arresting lever is thus not dependent on the acting force of a spring, and a possible defect of a spring cannot impair the function of the arresting device. Additionally, a user is provided with clear feedback from the operating unit as regards the position in which the arresting lever on the bottom side of the seat frame is situated. For example, if the seat frame is not precisely oriented on the carrier structure, and if an arresting lever is not aligned with a raster opening provided in the carrier structure, the arresting lever cannot be moved fully from its release position assumed during the displacement into an arresting position which arrests the seat frame on the carrier structure. Consequently, the operating unit likewise cannot be moved as far as the arresting position, and the user is made aware of the imprecise positioning. On the other hand, a user can directly feel or haptically perceive when an arresting lever is arranged in the respective raster opening.

In one advantageous embodiment, the arresting device has a housing with a first shaft mounted therein, which shaft is connected rotationally conjointly to the arresting lever, wherein an axis of rotation of the first shaft forms the pivot axis of the arresting lever. The arresting mechanism is coupled rotationally conjointly to the first shaft. The first shaft is consequently arranged parallel to the main extent direction of the carrier structure and is encapsulated from the outside by the housing. To realize a positively locking connection between the arresting lever and the respective raster opening, the housing should be dimensioned correspondingly. As an alternative to this, it is also possible for a corresponding aperture to be provided in the housing, which aperture is suitable for providing adequate freedom of movement for an engagement end averted from the first shaft. The rotationally conjoint coupling of the arresting mechanism to the first shaft may be realized in a variety of ways, which will be discussed in more detail below. The rotationally conjoint coupling of the first shaft to the arresting lever may be realized by means of a conventional shaft-hub connection.

The arresting lever is preferably designed to be pivoted between an arresting position oriented substantially perpendicular to the carrier structure and a release position running transversely thereto. The release position may be arranged at approximately 90° with respect to the vertical, that is to say substantially horizontally. It is self-evidently possible for the pivoting range to also be extended by up to 20° in both directions.

In an advantageous embodiment, an attachment shaft projects out of the housing and is oriented perpendicular to the first shaft. The first shaft and the attachment shaft are coupled to one another by means of a first bevel gear pair. The coupling by means of the bevel gear pair leads to a change in direction of the drive via the attachment shaft which is assigned to the arresting mechanism. Further elements, which lead to the operating unit, may attach to the attachment shaft. The attachment shaft is to be mounted in the housing, and provides a mechanical attachment outside the encapsulated region within the housing.

In a further advantageous embodiment, the carrier structure has a protruding slide rail, and the raster openings are formed as recesses, distributed along the main extent direction, of the slide rail. The slide rail is to be regarded as a rail or a rail strand which can be positioned fixedly with respect to a structure in the means of transport. A profile cross section of the slide rail may in particular have at least one undercut. A slide body may have a profile cross section corresponding to this, which profile cross section has a projection which can engage into the undercut. Reliable guidance can thus be made possible, and a lift-off of the slide body from the slide rail can be prevented. The recesses are to be understood to be at least partial or entire omissions of the profile cross section of the slide rail. The depth of the recesses, that is to say the extent of the recesses along the length of the carrier structure, may be selected practically as desired and adapted to the depth of the arresting lever, and vice versa. It may be recommendable to select a depth from approximately one centimetre up to a few centimetres.

The recesses particularly advantageously have a widening form facing towards the arresting lever. The arresting lever guided in the recess, that is to say the raster opening, has a greater clear spacing between the flanks of the recesses at the start of the insertion than during the continued insertion movement. The smallest possible clear spacing that can still be assumed by the arresting lever is preferably realized in the arresting position of the arresting lever. Firstly, easy guidance of the seat frame in the case of an arresting lever not exactly aligned with the respective raster opening can be realized. Secondly, it can be achieved that, in the arresting position, the arresting lever is in areal contact on both sides with flanks, which face towards one another, of the raster opening, which counteracts the generation of rattling noises.

The widening form may be manifested by virtue of the recesses having two flanks which face towards one another and which enclose an angle of between 0.5° and 5° with one another. This may suffice to realize areal contact with the arresting lever on both sides in the arresting position thereof.

The arresting lever preferably has a flat, disc-like form. The arresting lever can thus be easily introduced into a gap or recess, which has a constant width, of a carrier structure. The raster opening and the arresting lever must, for the arresting action, be brought into sufficiently exact alignment.

It is advantageous if the arresting mechanism has a pivotable operating lever with a drive linkage arranged thereon, wherein the drive linkage is coupled to a diverting lever which is coupled rotationally conjointly to a rotatably mounted connecting shaft, which connecting shaft is coupled rotationally conjointly to the arresting device. The operating lever may be arranged on a side surface of the seat frame, which side surface is, in the installed state, positioned for example at an aisle side. This can greatly improve accessibility for on-board personnel. In the case of a mechanical coupling between the arresting device and the operating unit by means of a connecting shaft, a mounting of the connecting shaft on a seat leg of the seat frame may be realized. This is normally situated spaced apart from the side surface, at least in the case of multiple seats on one single seat frame. The distance between the operating lever and the connecting shaft can consequently be bridged by means of the drive linkage. It is expedient to provide the same kinematic arrangement on the connecting shaft as on the operating unit. The spacing between an axis of rotation of the operating lever and the articulation point of the drive linkage on the operating lever may correspond to the spacing between the articulation point of the drive linkage on the diverting lever and the axis of rotation of the connecting shaft. The diverting lever may be connected rotationally conjointly to the connecting shaft by means of a shaft-hub connection. Preferably, the diverting lever and the operating lever, or an actuating arm connected to the operating lever, are oriented parallel to one another, and the position of the diverting lever follows that of the operating lever.

It is furthermore expedient for two arresting devices to be arranged on the bottom side of the seat frame, wherein the operating lever is coupled via the drive linkage to two pivot levers, which are each coupled to a connecting shaft. Both arresting devices may be assigned to a rear or front seat leg and selectively connect the seat frame at two adjacent positions to the carrier structure. The coupling by means of two separate connecting shafts which are each connected to the same drive linkage is mechanically extremely simple and robust.

As an alternative to this, use could also be made of a belt drive which, instead of the drive linkage, couples the two connecting shafts to the operating unit.

In one advantageous embodiment, the operating unit has an operating lever which is rotatable about a first axis of rotation. Preferably, the operating unit furthermore has a blocking device which blocks the operating unit. By means of the blocking device, it is for example possible for the operating lever to be held in a presently set position.

Preferably, at at least one end of a connecting shaft, there is arranged a joint which connects the connecting shaft to the arresting device or to the operating lever or to a component driven by the same. Such a joint may be a simple universal joint or cardan joint.

In one advantageous embodiment, the connecting shaft runs in a region of the seat frame between front and rear seat legs. Outwardly, an unchanged outer contour of the seat frame or of the seat legs can be maintained. A protective apparatus or a panelling for protecting a connecting shaft is required at most below the seat frame.

In an alternative embodiment, the connecting shaft may also run on a rear side of a rear seat leg.

Preferably, the seat frame has two rear seat legs which have in each case one arresting device, wherein, on the rear seat legs, there is arranged in each case one carriage which has the arresting device and which has a length which permits the arresting between two recesses. Damage to or misalignment of a carriage can thus be counteracted if it is ensured that a carriage is arrested not directly on a recess.

The invention furthermore relates to a means of transport having a cabin and having at least one passenger seat system with the above-described features formed therein. The means of transport may be an aircraft.

The means of transport may furthermore have service units above passenger seats, wherein the number of service units corresponds at least to the maximum possible number of passenger seats situated therebelow. A service unit could be understood to mean a device which has various displays, for example for a seatbelt fastening command or a non-smoking signal, a loudspeaker for announcements, an air nozzle, a container for oxygen masks and the like, and which correlates in each case with passenger seats situated therebelow. It is particularly advantageous if the number of service units corresponds at least to a maximum possible number of passenger seats situated therebelow in the respective region, such that, in the event of displacement of the passenger seats or in the event of a change of the seat spacings, a displacement of the service units is not necessary. It is furthermore conceivable to provide a number of service units which even exceeds the maximum possible number of passenger seats. Coverage of each passenger seat can consequently be ensured regardless of the spacings formed in between them. Depending on the respective region in the cabin that is to be equipped with the passenger seat system, it is possible to realize a certain overdeterminacy by virtue of the number of service units slightly exceeding the maximum number of passenger seats, wherein an excess of 5 to 10% would be conceivable, though this may also be greater or smaller.

BRIEF DESCRIPTION OF THE DRAWINGS

Further features, advantages and possible uses of the present invention will emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference designations are used for identical or similar objects.

DETAILED DESCRIPTION

Figure 1A:
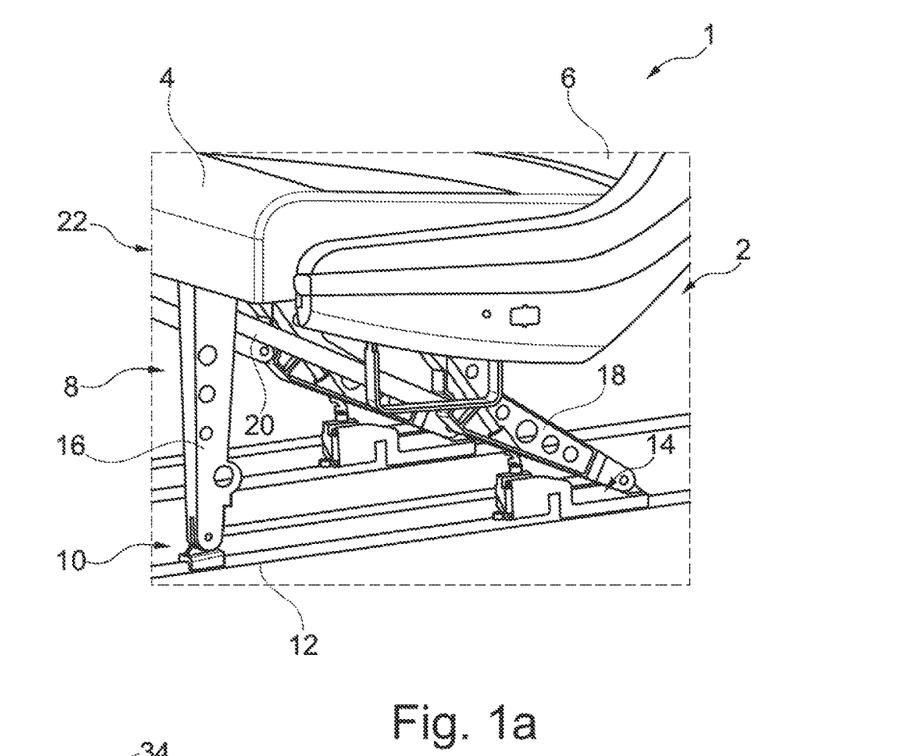
FIGS. 1a and 1b show a passenger seat system in a three-dimensional view and in a partial section.
Figure 1B:
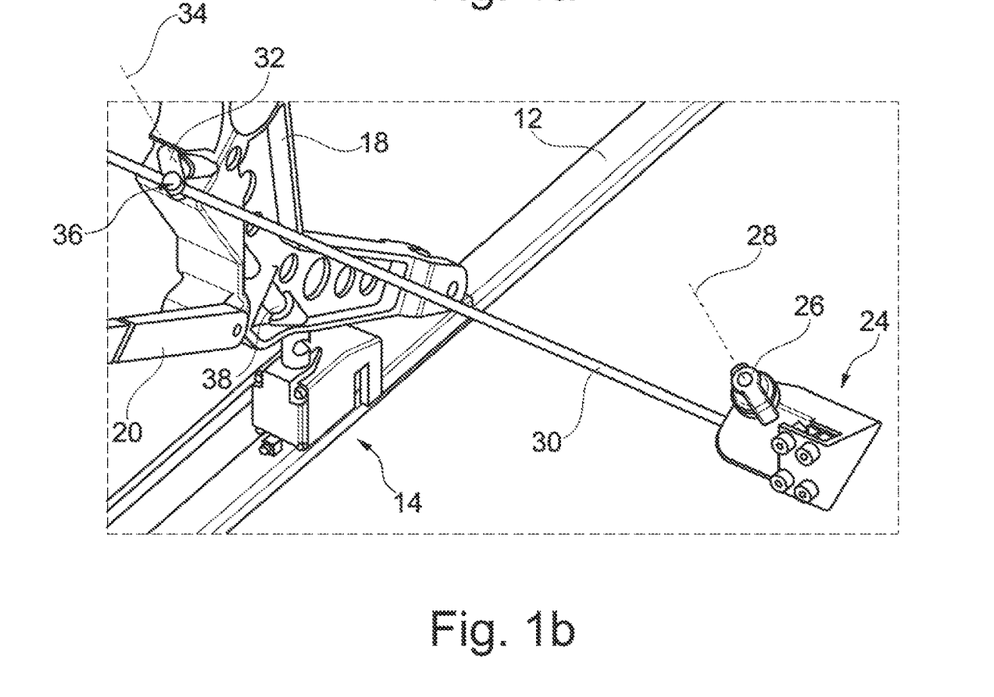

FIG. 1a shows a passenger seat system 1 having a passenger seat 2 with a seat surface 4, with a backrest 6, and with a seat frame 8, which seat frame lies with a bottom side 10 on a carrier structure 12 and is connected to the latter by means of an arresting device 14. The details will be presented in various illustrations in the further following figures. It is to be noted here that the carrier structure 12 is, in several illustrations, equipped with a removable or displaceably arranged cover.

The seat frame 8 has front seat legs 16, rear seat legs 18 and bearing tubes (not visible) held by the seat legs 16, 18. A diagonal strut 20 connects the front seat legs 16 to the rear seat legs 18 and increases the stiffness of the seat frame 8.

On a top side 22 of the seat frame 8, there is illustrated a part of an operating unit 24, which has an operating lever 26, which is mounted so as to be pivotable about a first axis of rotation 28, and a linkage or drive linkage 30 coupled to said operating lever. The linkage 30 is coupled by means of a pivot arm (not illustrated) to the operating lever 26 at a point spaced apart from the first axis of rotation 28. By means of the linkage 30, the pivoting movement of the operating lever 26 is transmitted to a pivot arm 32, which is mounted, so as to be pivotable about a second axis of rotation 34, on the rear seat leg 18. The spacing between the first axis of rotation 28 and a first articulation point of the linkage 30 preferably corresponds to the spacing between the second axis of rotation 34 and a second articulation point 36 of the linkage 30. The pivot arm 32 is furthermore arranged parallel to the pivot arm on the operating lever 26. The movement of the pivot arm 32 therefore follows that of the pivot arm that is connected to the operating lever 26.

The pivot arm 32 is furthermore connected rotationally conjointly to a connecting shaft 38, which is mounted rotatably on the rear seat leg 18 and which extends in the direction of the bottom side 10 of the seat frame 8. There, said connecting shaft may be coupled to the arresting device 14, as will be presented in more detail further below.

Figure 2A:
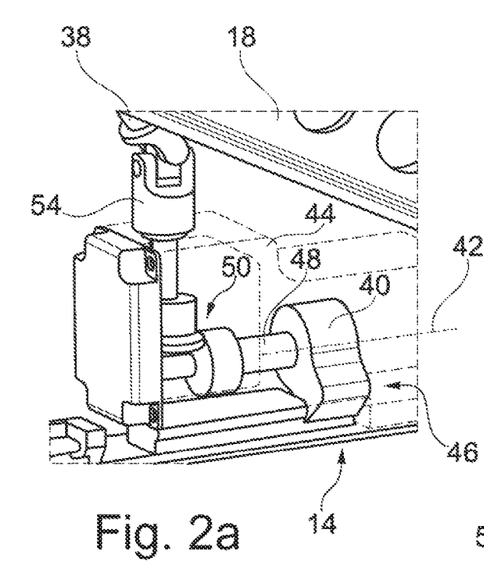
FIGS. 2a to 2c show the arresting device in several details.
Figure 2B:
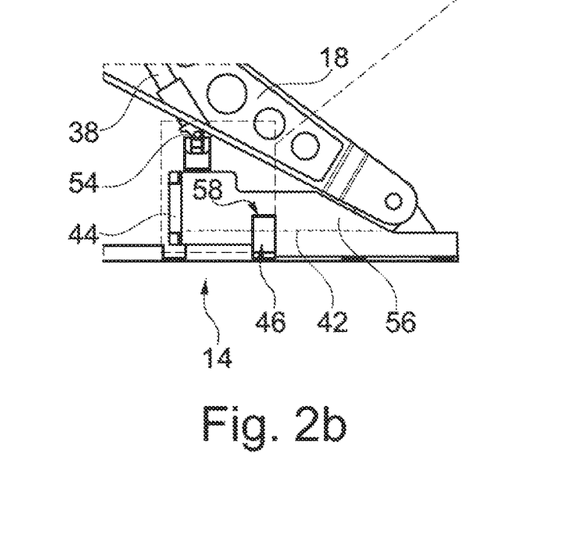
Figure 2C:
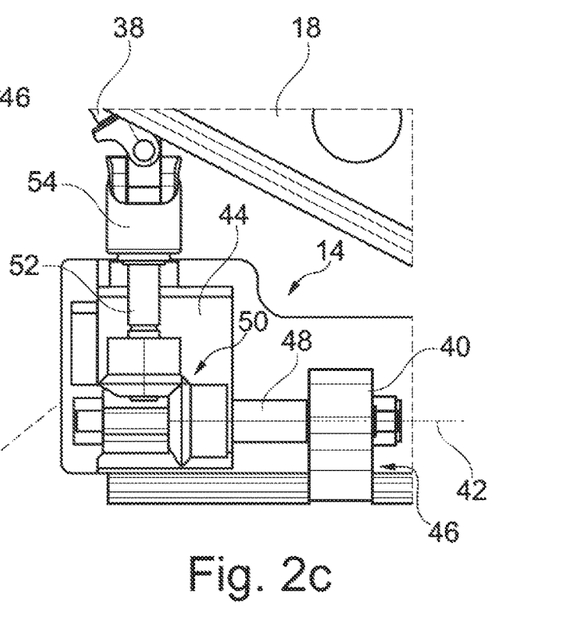

FIGS. 2a, 2b and 2c show the arresting device 14 in further details. Here, an arresting lever 40 is illustrated which is mounted, so as to be pivotable about a pivot axis 42, in a housing 44. Here, the pivot axis 42 runs parallel to a main extent axis of the carrier structure 12. The arresting lever 40 has a cam-like form with an engagement end 46. By rotation of a first shaft 48, which is connected rotationally conjointly to the arresting lever 40, the engagement end 46 can be moved about the pivot axis 42.

The first shaft 48 is mounted rotatably in the housing 44 and is coupled by means of a first bevel gear pair 50 to an attachment shaft 52, which extends perpendicular to the first shaft 48 and to the main extent direction of the carrier structure 12. The attachment shaft 52 projects out of the housing 44 at a top side and is connected by means of a cardan joint 54 to the connecting shaft 38. The rotation of the connecting shaft 38 therefore leads directly to a pivoting movement of the arresting lever 40.

As can be seen in particular in FIG. 2b, on the rear seat leg 18, there is arranged a carriage 56 which is guided on the carrier structure 12 and which bears or has the housing 44. It is also possible to see an aperture 58 in the housing 44, through which aperture the engagement end 46 can project out of the housing 44. The dimensioning of the housing 44 is consequently not dependent on the size of the arresting lever 46, and can be realized in a very slim form. In an arresting position, the arresting lever 40 furthermore remains entirely in the housing 44.

On the basis of FIGS. 3a to 3d, the mechanism and the sequence for the arresting action will be presented in more detail on the basis of further illustrations. The carrier structure 12 has in this case a slide rail 57 or a slide rail attachment 57 which has undercuts 60 which correspond (not shown) with projections in a profile cross section of a corresponding slide body in the carriage 56. The carriage 56 is thus prevented from being lifted off the carrier structure 12.

The carrier structure 12 has, arranged on its top side 61, multiple raster openings in the form of recesses 62, which run perpendicular to the main extent direction. The recesses 62 or raster openings 62 extend for example into both lateral delimitations 63 of the carrier structure 12. The recesses 62 are dimensioned such that the engagement end 46 of the arresting lever 40 can be pivoted into said recesses. In this way, a positively locking connection is realized which prevents a movement along the main extent direction of the carrier structure 12. In combination with the guidance function of the carrier structure 12 for the carriage 56, the movement of the carriage 56 and thus of the rear seat legs 18 and thus of the seat frame 8 is entirely prevented.

Figure 3A:
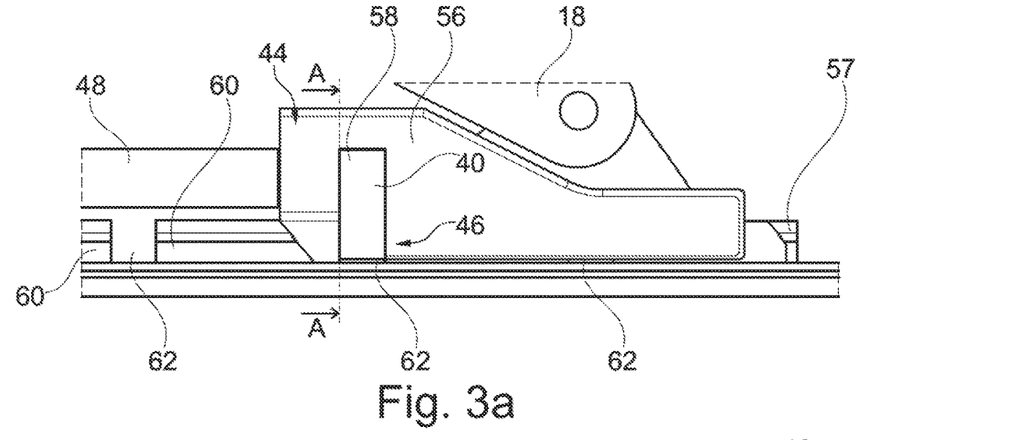
FIGS. 3a to 3d show the arresting device in further detail views.
Figures 3B, 3C:
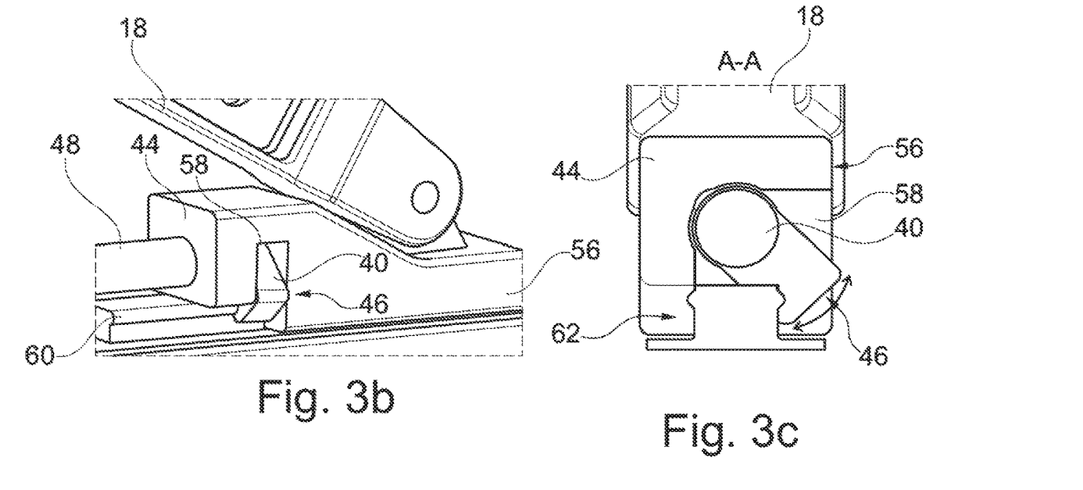
Figure 3D:
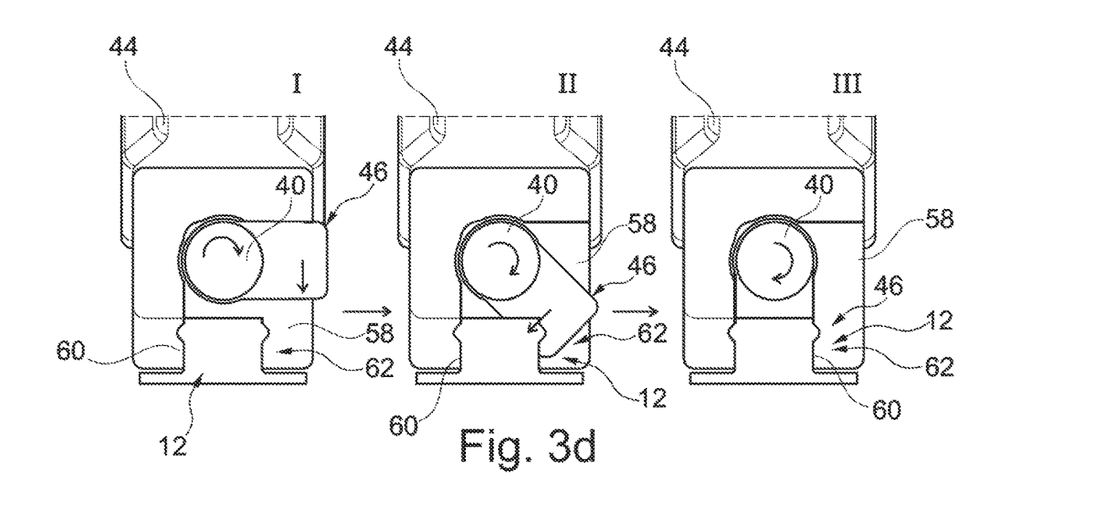

Whereas FIGS. 3a to 3c show an arbitrary position of the engagement end 46 between an arresting position and a release position, FIG. 3d illustrates the sequence between a release position I, a position during a pivoting movement II and in an arresting position III. As can be seen, the engagement end 46 is dimensioned correspondingly to the size of the recess 62. In other words, the width of the engagement end 62 corresponds to the width of the recess 62 or to the width of a foot of the carrier structure 12.

Figure 4A:
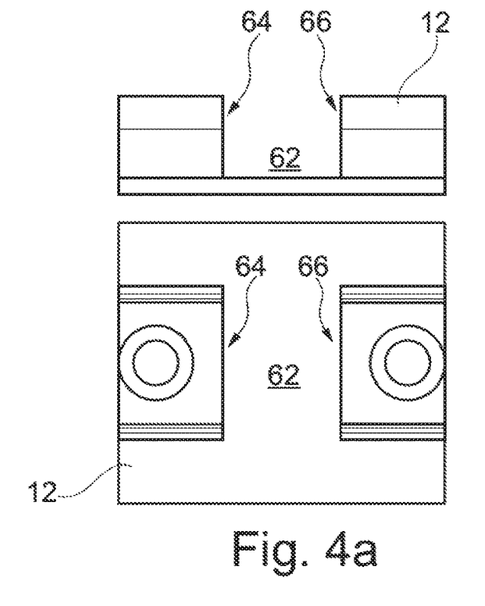
FIGS. 4a and 4b show the carrier structure with recesses in two different views.
Figure 4B:
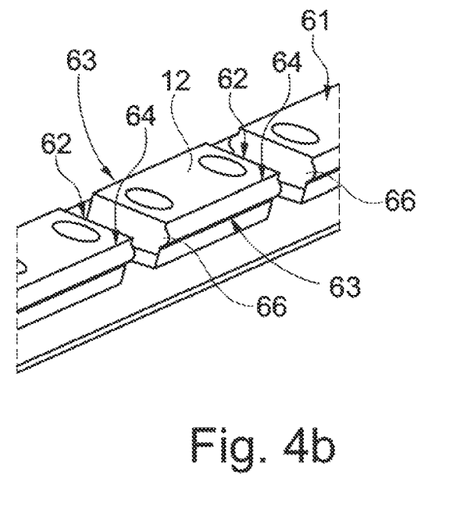

FIG. 4a shows a detail of the carrier structure 12 in the form of a slide rail attachment. The recess 62 has two flanks 64 and 66 which face towards one another and between which the engagement end 46 can be inserted. The recesses 62 are lined up at regular intervals on the carrier structure 12.

The flanks 64 and 66 have, for example, an angle with respect to one another which lies between 0.5° and 5°, that is to say said flanks are not entirely parallel. This leads to a slight narrowing in a direction averted from the release position of the arresting lever 40. As a result of the narrowing, a slight clamping of the arresting lever 40 can be realized, which can lead to a prevention of rattling noises.

Figure 5A:
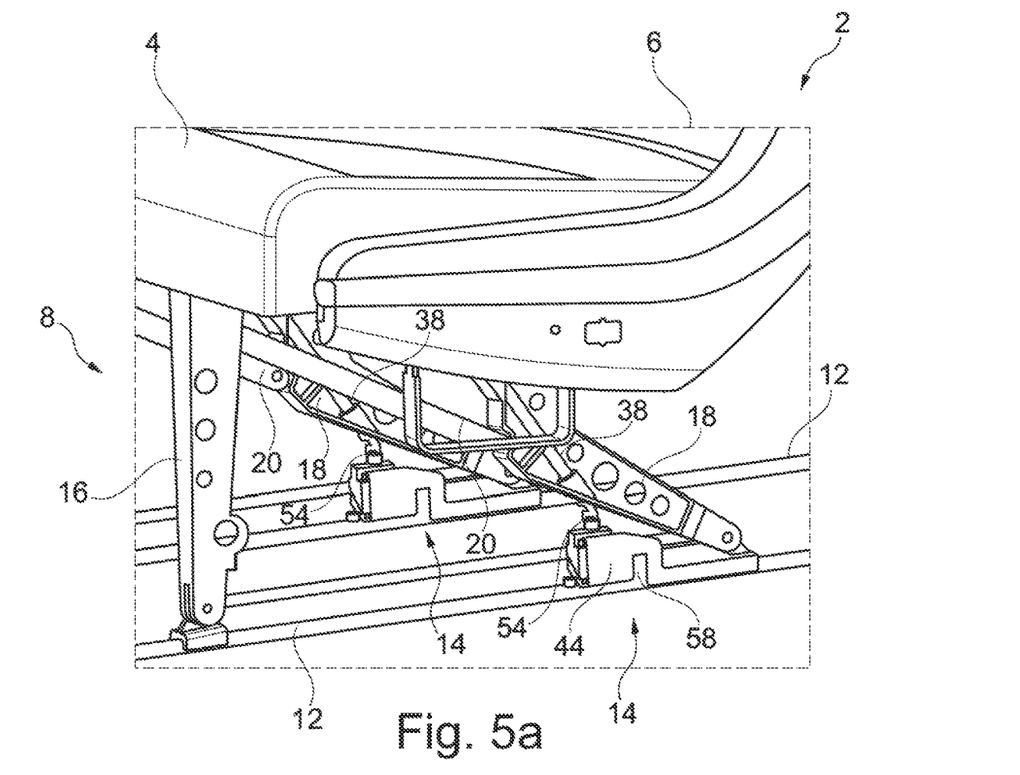
FIGS. 5a to 5e show the arrangement of two arresting devices in different exemplary embodiments and illustrations.

FIG. 5a illustrates the arrangement of two arresting devices 14 on two rear seat legs 18, which arresting devices permit secure arresting of the seat frame 8 as a whole and counteract oblique positioning or misalignment. The kinematic coupling of two arresting devices 14 to a single operating unit 24 is shown by way of example in FIGS. 5b to 5e.

Figure 5B:
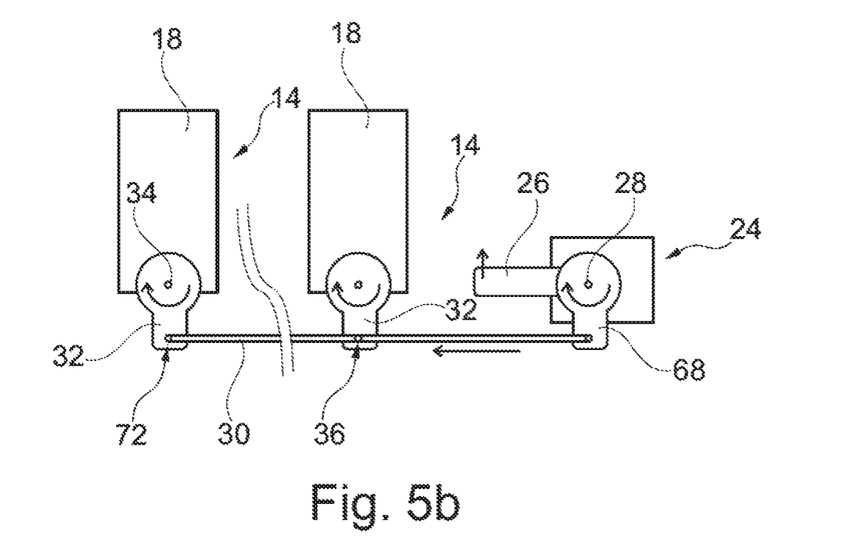

FIG. 5b illustrates a pivot arm 68 on the operating unit 24, which pivot arm is connected by means of an articulation point 70 to the linkage 30. Said linkage drives a pivot arm 32 of a first arresting device 14, and is designed such that a further pivot arm 32 of a second arresting device 14 is driven via a further articulation point 72. All of the pivot arms 32 and 68 are arranged parallel to one another, and the articulation points 32 have the same spacing to an associated axis of rotation 34 as the articulation point 68 of the operating unit has to the associated axis of rotation 28. This means that both pivot arms 32 are synchronous with the pivot arm 68 of the operating unit 24. The user is thus provided with clear haptic feedback regarding the position and the progress of the insertion movement of the arresting lever 40.

Figure 5C:
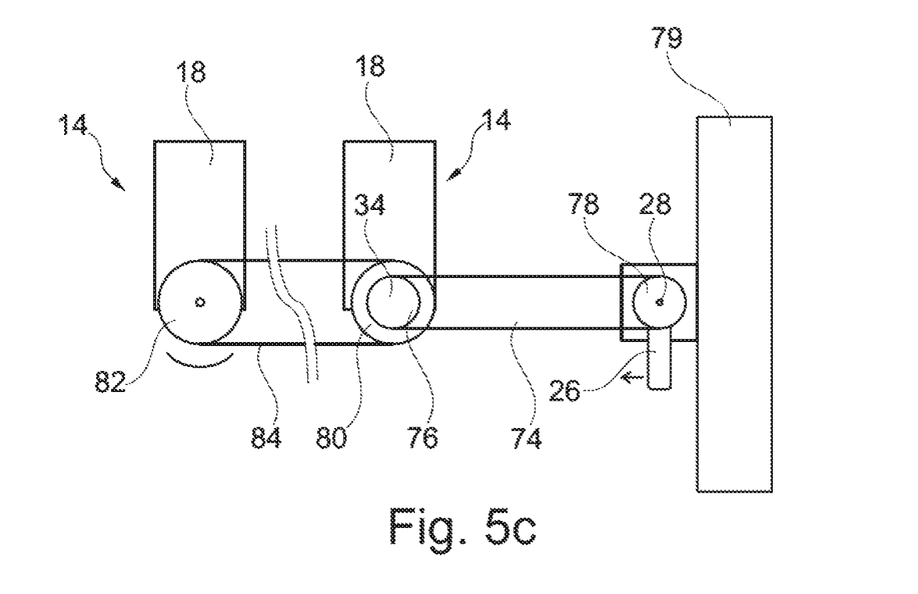

FIG. 5c shows, in an alternative variant, the transmission of the rotation of the operating unit 24 by means of a belt 74 to a first belt pulley 76, which can rotate about the axis of rotation 34. The drive of the belt 74 is preferably realized by means of a belt pulley 78, which is moved by means of the operating lever 26. If the belt pulleys 76 and 78 have the same diameter, the rotation of the belt pulley 76 exactly follows the movement of the operating lever 26. For the transmission of the movement to the second arresting unit 14, use is made of two further belt pulleys 80 and 82, which are arranged in each case on one of the arresting units 14. A further belt 84 runs between the belt pulleys 80 and 82. The belt pulleys 80 and 82 likewise have, by way of example, the same diameter, such that the rotation of the two belt pulleys 80 and 82 takes place with the same speed. By way of example, FIG. 5c illustrates the position of the operating unit 24 on a so-called "seat divider" 79.

Figure 5D:
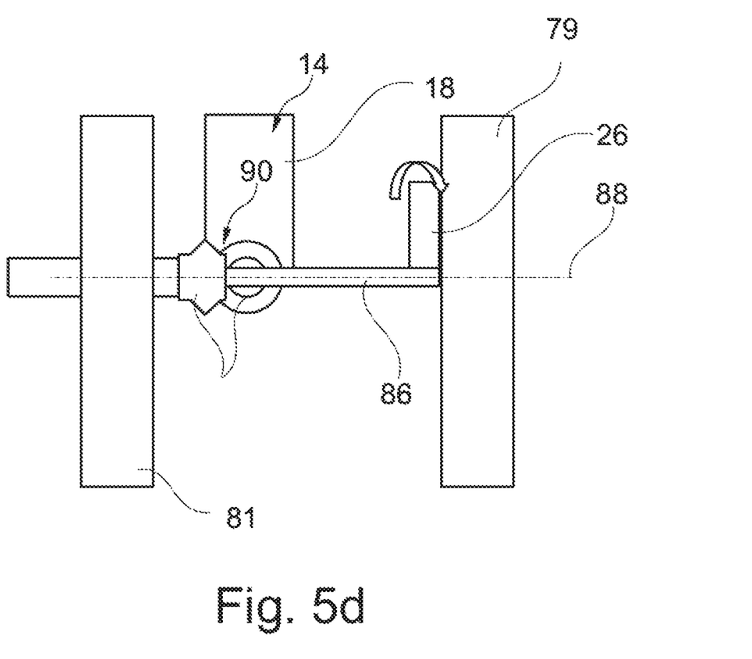

FIG. 5d illustrates a further alternative. Here, the operating lever 26 is connected directly to an adjusting shaft 86, which can be rotated about a third axis of rotation 88. Said adjusting shaft runs for example horizontally, and can, by means of individual bevel gear pairs 90, transmit the rotation to one or more arresting devices 14. The third axis of rotation 88 extends through a "seat divider" 79 and a frame component 81 of the seat frame 8, between which, by way of example, there is illustrated a rear seat leg 18.

Figure 5E:
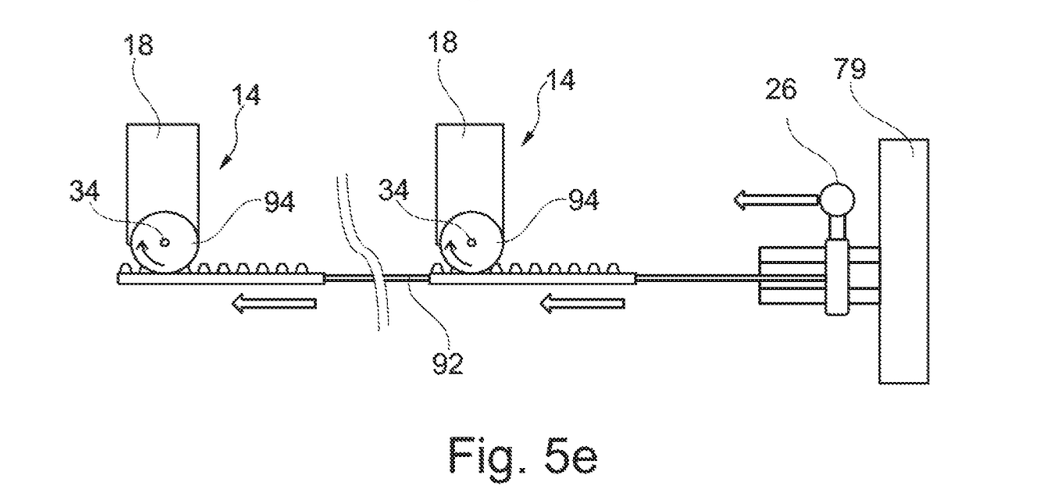

FIG. 5e illustrates an operating lever 26 which is displaceable in a horizontal direction and which, here, drives a toothed rack 92. Individual arresting devices 14 can be driven by means of gearwheels 94, which are each mounted so as to be rotatable about the axis of rotation 34 and which engage into the toothed rack 92.

Figure 6:
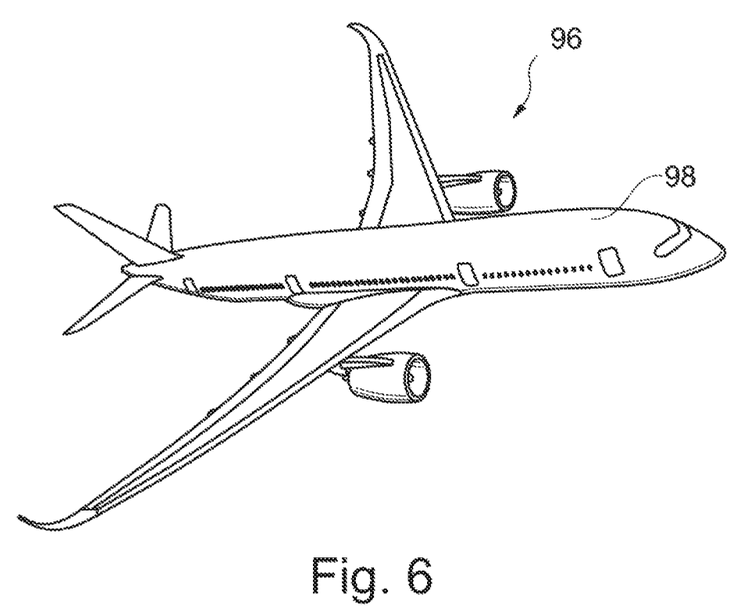
FIG. 6 shows an aircraft with a passenger seat system installed therein.

Finally, FIG. 6 shows an aircraft 96 with a cabin 98 formed therein, which cabin has at least one passenger seat system with the features mentioned above installed therein.

It is additionally pointed out that "having" does not rule out other elements or steps, and "a" or "an" does not rule out a multiplicity. It is also pointed out that features that have been described with reference to one of the above exemplary embodiments may also be used in combination with other features of other exemplary embodiments described above. Reference designations in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat system for a means of transport, comprising:
    at least one elongate carrier structure configured to be attached, fixedly with respect to a structure, in the interior of the means of transport and having a main extent axis and a plurality of mutually spaced-apart raster openings on a top side of the carrier structure, the raster openings projecting into at least one lateral delimitation of the carrier structure;
    at least one seat having a seat frame, the seat frame being displaceable and arrestable on the carrier structure and having a bottom side lying on the carrier structure, and a top side holding a seat surface,
    wherein the seat frame has a first arresting device on the bottom side and has an operating unit coupled to the arresting device, at a position averted from the bottom side,
    wherein the operating unit is movable at least into an arresting position and an unlocking position, and
    wherein the first arresting device has an arresting lever mounted so as to be pivotable about a pivot axis running parallel to the main extent axis and movable into an engagement position, for at least lateral engagement into one of the raster openings of the carrier structure, and a release position, wherein the arresting lever is released from the carrier structure.

2. The passenger seat system according to claim 1, wherein an arresting mechanism mechanically directly couples the first arresting device to the operating unit such that the position of the arresting lever is determined exclusively by the position of the operating unit.

3. The passenger seat system according to claim 2,
    wherein the first arresting device has a housing with a first shaft mounted therein, the shaft being connected rotationally conjointly to the arresting lever,
    wherein an axis of rotation of the first shaft forms the pivot axis of the arresting lever, and
    wherein the arresting mechanism is coupled rotationally conjointly to the first shaft.

4. The passenger seat system according to claim 3,
    wherein an attachment shaft projects out of the housing and is oriented perpendicular to the first shaft, and
    wherein the first shaft and the attachment shaft are coupled to one another by a first bevel gear pair.

5. The passenger seat system according to claim 1,
wherein the carrier structure has a protruding slide rail, and
wherein the raster openings are formed as recesses, distributed along the main extent axis, of the slide rail.

6. The passenger seat system according to claim 5, wherein the recesses have a widening form facing towards the arresting lever.

7. The passenger seat system according to claim 6, wherein the recesses have two flanks facing one another and enclosing an angle of between 0.5° and 5° with one another.

8. The passenger seat system according to claim 1, wherein the arresting lever has a flat, disc-like form.

9. The passenger seat system according to claim 1,
wherein the arresting mechanism has a pivotable operating lever with a drive linkage arranged thereon, and
wherein the drive linkage is coupled to a pivot arm coupled rotationally conjointly to a rotatably mounted connecting shaft, the connecting shaft being coupled rotationally conjointly to the arresting device.

10. The passenger seat system according to claim 9, further comprising a second arresting device arranged on the bottom side of the seat frame, and
wherein the operating lever is coupled via the drive linkage to two pivot arms, which are each coupled to a connecting shaft.

11. The passenger seat system according claim 1,
wherein the seat frame has two rear seat legs which have in each case one arresting device,
wherein, on the rear seat legs, there is arranged in each case one carriage having the arresting device and having a length which permits the arresting between two recesses.

12. A means of transport, having a cabin and having at least one passenger seat system according to claim 1 formed therein.

13. The means of transport according to claim 12, wherein the means of transport is an aircraft.

14. The means of transport according to claim 12, further comprising service units above passenger seats, wherein a number of service units corresponds at least to a maximum possible number of passenger seats situated therebelow.

* * * * *